Sept. 29, 1942.   O. WILD, JR   2,296,966
REGISTERING AND COMPUTING MECHANISM
Filed Feb. 1, 1941   4 Sheets—Sheet 1

Inventor
OTTO WILD, JR.

Sept. 29, 1942.   O. WILD, JR   2,296,966
REGISTERING AND COMPUTING MECHANISM
Filed Feb. 1, 1941   4 Sheets-Sheet 2

Inventor
OTTO WILD, JR.
By Sickinger, Huxley, Byron & Knight
Attorneys

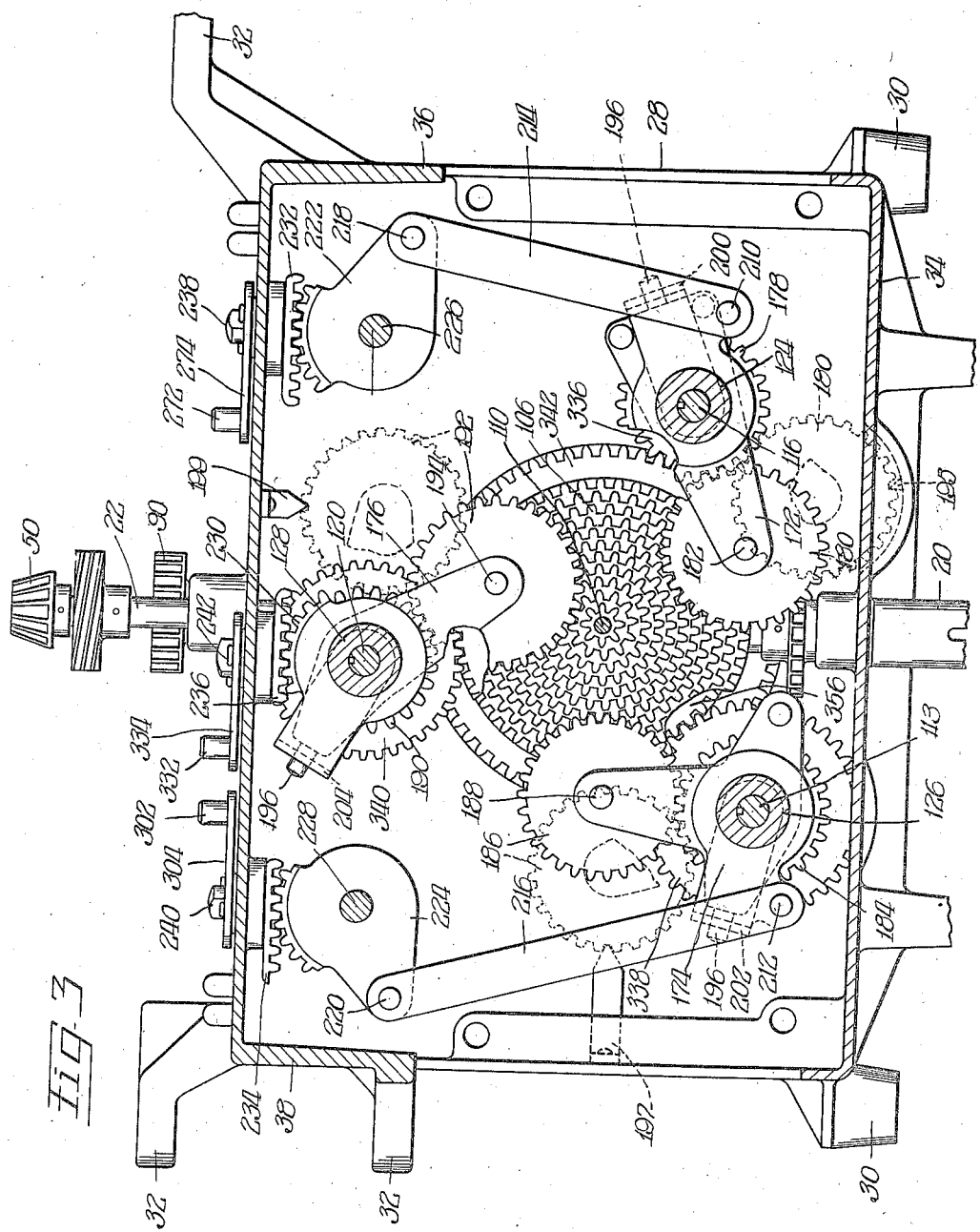

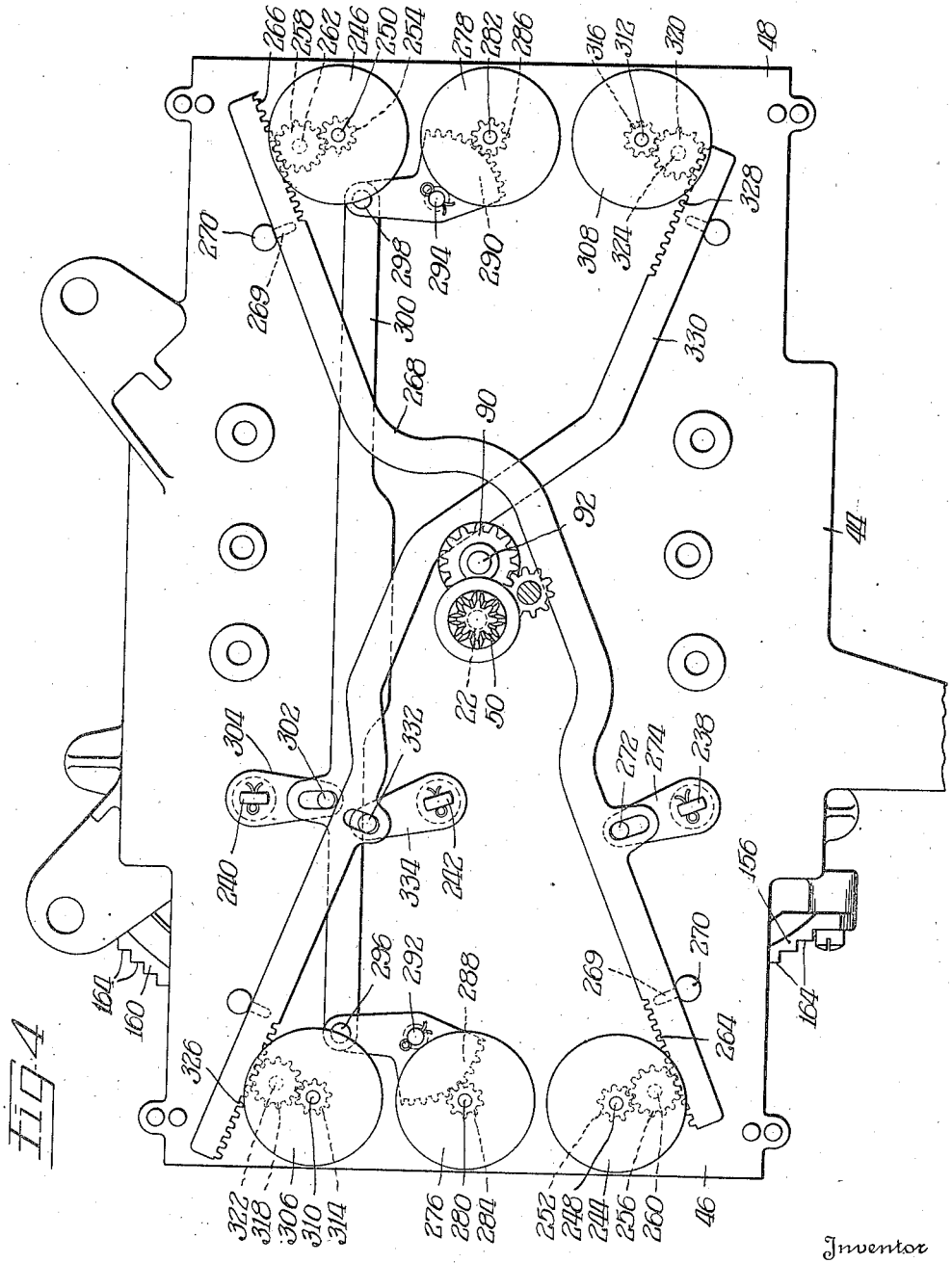

Patented Sept. 29, 1942

2,296,966

UNITED STATES PATENT OFFICE 2,296,966

REGISTERING AND COMPUTING MECHANISM

Otto Wild, Jr., Hartford, Conn., assignor, by mesne assignments to The Wayne Pump Company, Fort Wayne, Ind., a corporation of Maryland Application February 1, 1941, Serial No. 376,967

9 Claims. (Cl. 74—283)

This invention pertains to a computing head for a liquid dispensing apparatus, and more particularly to a variating or integrating means therefor.

It is an object of this invention to provide a computing head wherein a variator is interposed between the registering mechanism and the meter, and so arranged that the setting of the variator may be accomplished from one side thereof.

Another object is to provide speed variating mechanism which is provided with means tending always to maintain the device in fully set position.

Still another object is to provide a computing head having simple and inexpensive daily price indicating means operable as the variator of the head is set.

A further object of the invention is to provide variating mechanism wherein the computing mechanism is arranged horizontally, but the initial and resulting movements are introduced and taken therefrom in a vertical direction.

With these and various other objects in view, the invention may consist of certain novel features of construction and operation as will be more fully described and particularly pointed out in the specification, drawings and claims appended hereto.

In the drawings, which illustrate an embodiment of the device, and wherein like reference characters are used to designate like parts—

Figure 3 is an enlarged transverse sectional elevation of the variating mechanism illustrated in Figure 2, the same being taken substantially in the plane as indicated by the line 3—3 of Figure 2;

Figure 4 is a top plan view of the variator mechanism showing the daily price indicating means therefor.

Figure 1:
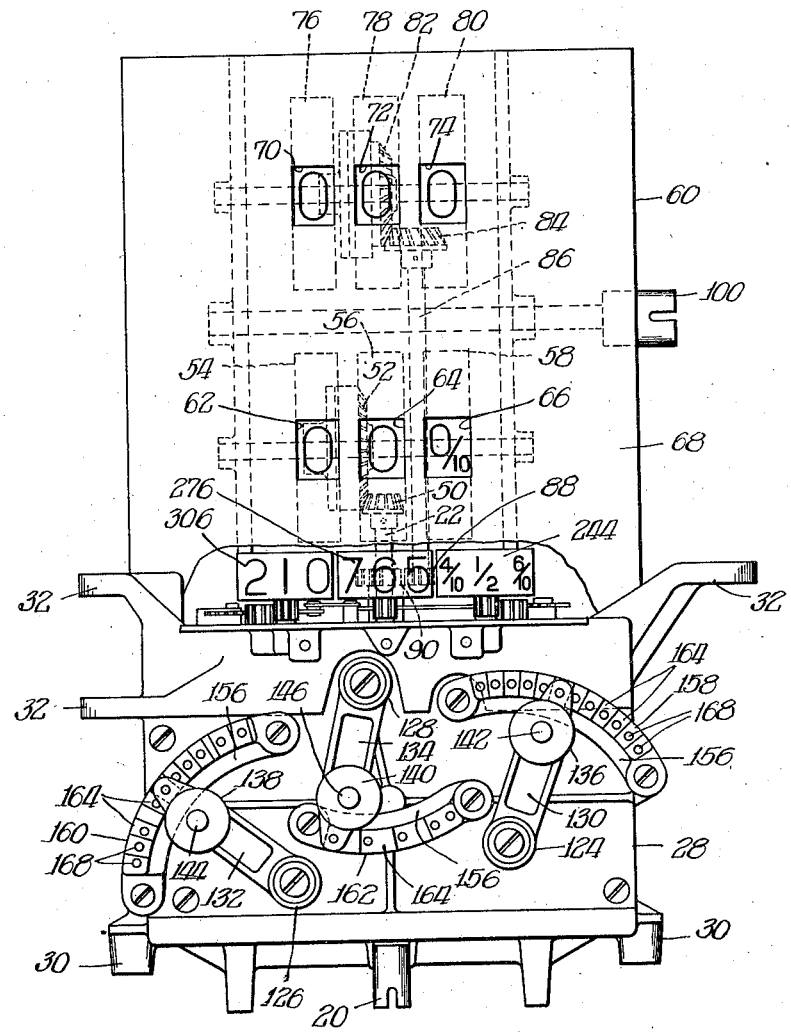
Figure 1 is an elevation of a computing head embodying the invention.

While the computing head and variating mechanism therefor shown are particularly applicable to the so-called computing pump as shown in Patent No. 2,151,239 to Slye et al., issued March 21, 1939, it is of course understood that such computing head, or the variating means therefor is adapted for many uses in computing or integrating, such as in the textile, weighing machine, etc. arts.

In a liquid dispensing apparatus in use today embodying a computing head, the liquid dispensing apparatus consists essentially of a pump, the suction side of which is adapted to be connected to a source of liquid supply, the pump being operated by suitable means such as an electric motor which may be controlled by a switch operable by means adjacent the hose support. The outlet side of the pump may be connected through a suitable air separator to the inlet side of the meter, the liquid passing through the meter causing operation thereof, which in turn causes rotation of the so-called meter shaft, the rotation of the shaft being proportional to the amount of liquid passing through the meter.

The outlet side of the meter is connected through a suitable sight gauge to the hose, and the flow from the hose is controlled by a nozzle having an operable nozzle valve therein. The meter shaft is the means of operating or controlling the operation of the computing head, and said meter shaft may be connected through a suitable coupling 20 to the drive shaft 22 journaled as at 24 and 26 in the variator housing or casing 28. The variator housing 28 may conveniently be provided with the lower and upper supporting members 30 and 32. The casing 28 includes the base member 34, spaced side members 36 and 38, front and back members 40 and 42 respectively, and the top member 44 provided with the extensions 46 and 48.

The shaft 22 is provided with the bevel gear 50 meshing with the bevel gear 52 for operating numeral wheels 54, 56 and 58 of the amount portion of the register 60, said wheels indicating respectively the tens, units and tenths or fractions of a gallon (or the unit of measure), the units being visible through the spaced windows 62, 64 and 66 of the dial 68.

The dial 68 is also provided with the spaced windows 70, 72 and 74 through which the numerals provided on the numeral wheels 76, 78 and 80 may be viewed for the cost portion of the register, said numeral wheels being respectively for dollars, tens of cents and cents (or other specie) respectively. Said numeral wheels are adapted to be driven from the bevel gear 82, which in turn is driven by the bevel gear 84 provided on the shaft 86. The shaft 86 extends downwardly, and is provided with the gear 88 meshing with the gear 90 provided on the driven shaft 92, said shaft being journaled in the housing as at 94 and in a bracket 96 in said housing as at 98. It is of course understood that the register 60 is provided with similar numeral wheels on the opposite side of the register, said numeral wheels being driven by suitable cross drives, and being provided with the reset means as indicated at 100.

The shaft 22 is provided with the bevel gear 102 meshing with the bevel gear 104 provided on the gear cone 106. The gear cone 106 is provided with the drive gear steps 108 for variable setting of the variator, said gear cone being rotatably mounted on the drive gear shaft 110 supported in the front plate 40 of the casing 28 as at 112, and in the bracket 96 as at 114.

Figure 2:
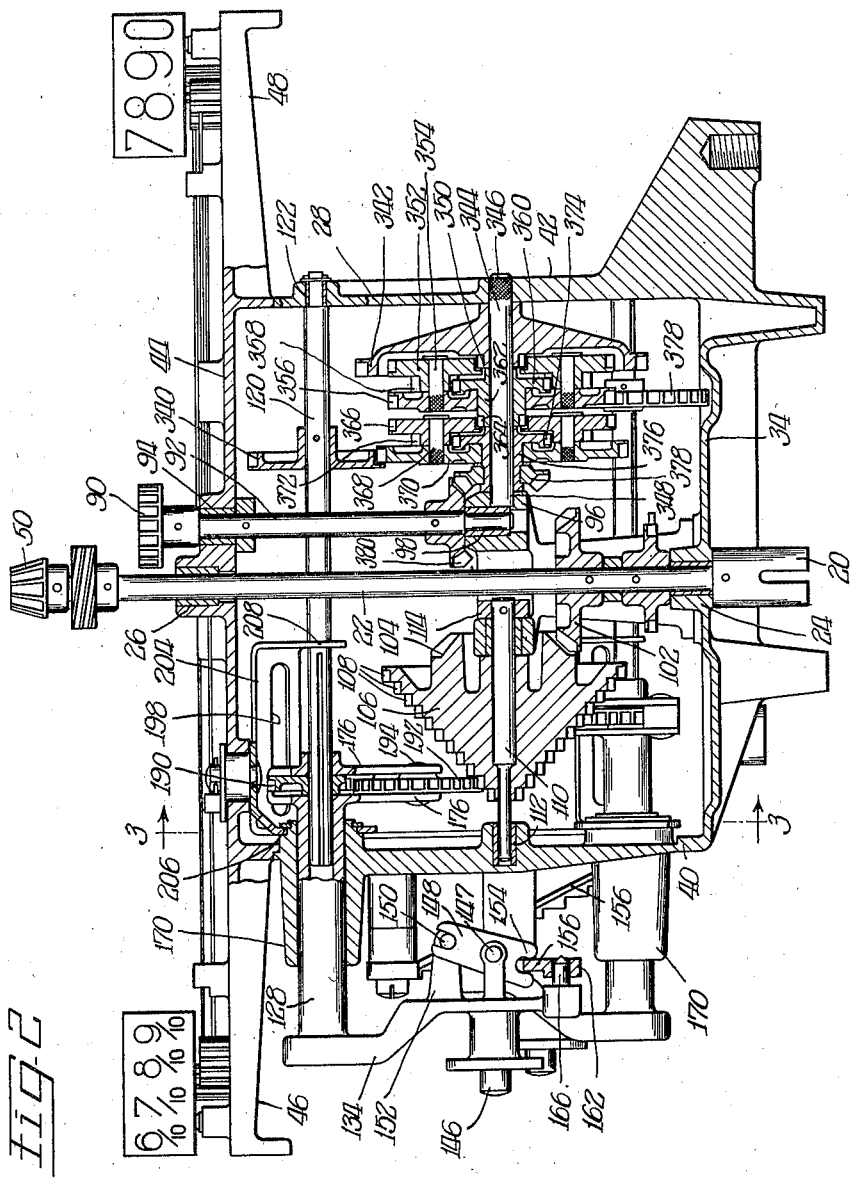
Figure 2 is an enlarged side elevation of the variating mechanism illustrated in Figure 1, a part of said variating mechanism being illustrated in section, the section being taken substantially on the longitudinal center line of said variator.

The supplemental shafts 116, 118 and 120 are journaled in the rear plate 42 as shown at 122 for the shaft 120, and the forward ends of said shafts are journaled respectively in elongated bearing hubs or shafts 124, 126 and 128 of the operating levers 130, 132 and 134 such as particularly shown in Figure 2 for the shaft 120. The levers or cranks 130, 132 and 134 are each provided with convenient knobs 136, 138 and 140, said knobs being provided with the spring-pressed plungers 142, 144 and 146 extending through the knobs and operating levers, and being pivoted, as shown for the plunger 146 in Figure 2, as at 147 to the links 148. The links 148 are pivoted as at 150 to a bracket or pedestal 152 provided on each of said operating levers, the ends of said links being bifurcated or provided with the jaws 154 adapted to embrace a track portion 156 provided respectively on the fractions quadrant 158, the units quadrant 160, and the tens quadrant 162. Each of said quadrants is provided with a suitable number of steps 164 corresponding to the number of driving gears to be used by the particular operating lever, and, in addition, there is a zero step on each quadrant in which latter position the supplemental shafts so set to zero are rendered non-rotatable.

Each of the operating levers 130, 132 and 134 is provided with a pin 166 adapted to be received in the respective apertures 168 provided on the steps of the quadrant. It will thus be seen that the spring-pressed plungers 142, 144 and 146 urge the links 148 toward the respective operating levers, tending to seat the pins 166 in their respective apertures, forming means for preventing accidental release of the operating levers from the selected positions on the quadrants. The hubs 124, 126 and 128 extend through the elongated bosses 170 provided on the front panel 40 and into the housing, and said hubs are respectively provided with the gear shifting levers 172, 174 and 176. The gear shifting lever 172 embraces the gear 178 slidably but non-rotatably mounted on the shaft 116, and the gear 178 meshes with the selecting gear 180 rotatably mounted on said gear shifting lever as at 182. The gear shifting lever 174 embraces the gear 184 slidably but non-rotatably mounted on the shaft 118, said gear meshing with the driving gear 186 pivotally mounted the gear shifting lever as at 188. The gear shifting lever 176 embraces the gear 190 slidably but non-rotatably mounted on the shaft 120, said gear meshing with the selecting gear 192 pivoted to said gear shifting lever as at 194.

When the operating levers 130, 132 and 134 are moved to the selected position (except zero) on the quadrants, the selecting gears 180, 186 and 192 are moved to engage the corresponding drive gear steps 108 of the gear cone 106. When the operating levers are moved to zero position, the selecting gears are moved to the dotted line positions as shown in Figure 3 to engage the lugs 195, 197 and 199 provided on the housing, whereby rotation of the supplemental shafts of the operating levers is prevented. Each of said gear shifting levers is provided with the pin 196 engageable in a slot 198 provided respectively in the bails or straps 200, 202 and 204, said straps being pivoted as at 206 and 208 to the respective bosses 170 and the supplemental shafts 116, 118 and 120, such as shown in Figure 2 for the shaft 120. It will thus be seen that movement of the shifting levers of the selecting gears 180, 186 and 192 to the different drive gear steps 108 will cause corresponding movement of the bails. The bails 200 and 202 are pivotally connected as at 210 and 212 to the links 214 and 216. Said links are pivoted as at 218 and 220 to the mutilated gears 222 and 224 pivoted as at 226 and 228, and the bail 204 is provided with the mutilated gear 230. The mutilated gears 222, 224 and 230 mesh with the mutilated gears 232, 234 and 236 respectively, non-rotatably provided on the shafts 238, 240 and 242 extending through the top plate 44 of the housing 28.

The fraction numeral wheels 244 and 246 are pivoted as at 248 and 250 to the extensions 46 and 48 of the upper member 44 and non-rotatably provided with the pinions 252 and 254. Said pinions mesh with the pinions 256 and 258 pivoted to the members 46 and 48 as at 260 and 262, said pinions being engaged by the racks 264 and 266 of the transverse and diagonal link 268. Said link 268 is supported on the spaced supports 269 and positioned by the lugs 270, and said link is loosely pivoted as at 272 to the arm 274 non-rotatably provided on the shaft 238.

The units numeral wheels 276 and 278 are pivoted as at 280 and 282 to the spaced supports 46 and 48, and are non-rotatably provided with the pinions 284 and 286. The pinions 284 and 286 mesh with the mutilated gears 288 and 290 pivoted as at 292 and 294 to the supports 46 and 48, and said mutilated gears are pivoted as at 296 and 298 to the link 300 extending transversely of the variator and being loosely pivoted as at 302 to the arm 304 non-rotatably provided on the shaft 240.

The tens numeral wheels 306 and 308 are provided at opposite sides of the variator, being pivoted to the supports 46 and 48 as at 310 and 312, and being non-rotatably provided with the pinions 314 and 316 meshing with the pinions 318 and 320 pivoted to the supports 46 and 48 as at 322 and 324. The pinions 318 and 320 are engaged by the racks 326 and 328 of the transverse and diagonally disposed link 330, said link being loosely pivoted as at 332 to the arm 334 non-rotatably provided on the shaft 242.

It will thus be seen that by setting the operating levers 130, 132 and 134, movement of the bails, through movement of the gear shifting levers, causes the mutilated gears 222, 224 and 230 to correspondingly move the shafts 238, 240 and 242, whereby movement of the links 268, 300 and 330 causes corresponding rotation of the fractions, units, and tens numeral wheels to show the setting of the variator.

The supplemental shafts 116, 118 and 120 are non-rotatably provided with the gears 336, 338 and 340. The gear 336 meshes with the gear 342 rotatably mounted on the differential gear shaft 344, said shaft being secured in the rear plate 42 as at 346, and in the bracket 96 as at 348. The gear 342 is provided with the gear 350 meshing with the gear 352 pivoted as at 354 to the gear 356 meshing with the gear 338. The gear 352 is non-rotatably provided with the gear 358 meshing with the gear 360 rotatably mounted on the shaft 344, the gear being provided with a hub portion 362 on which the gear 356 is rotatably mounted. The hub portion 362 is provided with a gear 364 meshing with the gear 366 pivotally mounted as at 368 to the gear 370 meshing with the gear 340 provided on the supplemental shaft 120.

The gear 366 is non-rotatably provided with the gear 372 meshing with the gear 374 rotatably mounted on the shaft 344, being provided with the hub portion 376 on which the gear 370 is rotatably mounted, the hub portion being provided with the bevel gear 378 driving the bevel gear 380 non-rotatably mounted on the driven shaft 92. It will thus be seen that the gear cone 106 drives the supplemental shafts, causing the motion from the supplemental shafts to be combined by the differential gearing so that the combined motion is transmitted to the driven shaft 92. Said motion is then transmitted to the registering mechanism to show the computed price.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

What is claimed is:

1. In variating mechanism, the combination of a housing, a vertically disposed drive shaft journalled in said housing, a horizontally disposed drive gear shaft disposed in said housing, rotatable drive gears mounted on said drive gear shaft, a connection between said drive gears and said drive shaft whereby said drive shaft drives said drive gears, supplemental shafts journalled in said housing and disposed so that the axes of said supplemental shafts are parallel to the axis of rotation of said drive gears, a gear shifting lever slidably mounted on each of said supplemental shafts, a gear non-rotatably and slidably mounted on each of said supplemental shafts and movable with said gear shifting lever, a shifting gear meshing with said slidable gear and rotatably mounted on each of said levers, said shifting gears being adapted to be moved to selectively engage said drive gears, a connection to each of said levers extending through one side of said casing and provided with an operating lever, a quadrant on said casing adjacent each operating lever, each of said quadrants having a step corresponding to the drive gear to be selected by the shifting gear of the respective levers, a track on each quadrant, means on each operating lever resiliently engaging said respective track to urge said operating lever to selected position whereby the respective shifting gears are urged to full engaged position with the selected drive gears, a horizontally disposed differential shaft disposed in said housing, differentially arranged gears disposed on said differential shaft and adapted to be driven by said supplemental shafts, and a vertically disposed driven shaft operatively connected to said differentially arranged gears.

2. In variating mechanism, the combination of a vertically disposed drive shaft, drive gears of different diameters mounted to rotate about a horizontal axis, a connection between said drive gears and drive shaft whereby said drive shaft drives said drive gears, horizontally disposed supplemental shafts, gears for driving said supplemental shafts, a rotatable crank for each supplemental shaft, a crank shaft for each crank slidably disposed with respect to said supplemental shafts and forming bearings therefor, the crank shaft for each supplemental shaft being provided with a lever movable with the crank of said crank shaft for moving the said last named gears to selectively engage said drive gears, a horizontally disposed differential shaft, differentially arranged gears disposed on said differential shaft and adapted to be driven by said supplemental shafts, a vertically disposed driven shaft operatively connected to said differentially arranged gears, indicating means for showing the engagement between said second named gears and the selected drive gears, operative connections between said indicating means and said second named gears, said operative connections including a bail pivoted with respect to each supplemental shaft, a slidable connection between said second named gears and each bail, and a gear connection between each bail and indicating means.

3. In variating mechanism, the combination of a drive shaft, a drive gear shaft, drive gears of different diameters rotatably mounted on said drive gear shaft, a connection between said drive gears and drive shaft whereby said drive shaft drives said drive gears, supplemental shafts, gears for driving said supplemental shafts, a rotatable crank for each supplemental shaft, a crank shaft for each crank slidably disposed with respect to said supplemental shafts and forming bearings therefor, the crank shaft for each supplemental shaft being provided with a lever movable with the crank of said crank shaft for moving the said last named gears to selectively engage said drive gears, a differential shaft, differentially arranged gears disposed on said differential shaft and adapted to be driven by said supplemental shafts, a driven shaft operatively connected to said differentially arranged gears, indicating means for showing the engagement between said second named gears and the selected drive gears, operative connections between said indicating means and said second named gears, said operative connections including a bail pivoted with respect to each supplemental shaft, a slidable connection between said second named gears and each bail, and a gear connection between each bail and indicating means.

4. In variating mechanism, the combination of a vertically disposed drive shaft, a horizontally disposed drive gear shaft, drive gears of different diameters mounted on said drive gear shaft, a connection between said drive gears and said drive shaft whereby said drive shaft drives said drive gears, supplemental shafts, gears for driving said supplemental shafts, a rotatable crank for each supplemental shaft, a crank shaft for each crank slidably disposed with respect to said supplemental shafts and forming bearings therefor, the crank shaft for each supplemental shaft being provided with a lever movable with the crank of said crank shaft for moving the said last named gears to selectively engage said drive gears, a horizontally disposed differential shaft, differentially arranged gears disposed on said differential shaft and adapted to be driven by said supplemental shafts, a vertically disposed driven shaft operatively connected to said differentially arranged gears, indicating means for showing the engagement between said second named gears and the selected drive gears, operative connections between said indicating means and said second named gears, said operatve connections including a bail pivoted with respect to each supplemental shaft, a slidable connection between said second named gears and each bail, and a gear connection between each bail and indicating means.

5. In variating mechanism, the combination of a drive shaft, a drive gear shaft, drive gears of different diameters mounted on said drive gear shaft, a connection between said drive gears and said drive shaft whereby said drive shaft drives said drive gears, supplemental shafts, gears for driving said supplemental shafts, a rotatable crank for each supplemental shaft, a crank shaft for each crank slidably disposed with respect to said supplemental shafts and forming bearings therefor, the crank shaft for each supplemental shaft being provided with a lever movable with the crank of said crank shaft for moving the said last named gears to selectively engage said drive gears, a differential shaft, differentially arranged gears disposed on said differential shaft and adapted to be driven by said supplemental shafts, a driven shaft operatively connected to said differentially arranged gears, indicating means for showing the engagement between said second named gears and the selected drive gears, operative connections between said indicating means and said second named gears, and operative connections including a bail pivoted with respect to each supplemental shaft, a slidable connection between said second named gears and each bail, and a gear connection between each bail and indicating means.

6. In variating mechanism, the combination of a housing, a vertically disposed drive shaft journalled in said housing, a horizontally disposed drive gear shaft disposed in said housing, rotatable drive gears mounted on said drive gear shaft, a connection between said drive gears and said drive shaft whereby said drive shaft drives said drive gears, supplemental shafts journalled in said housing and disposed so that the axes of said supplemental shafts are parallel to the axis of rotation of said drive gears, a gear shifting lever slidably mounted on each of said supplemental shafts, a gear non-rotatably and slidably mounted on each of said supplemental shafts and movable with said gear shifting lever, a shifting gear meshing with said slidable gear and rotatably mounted on each of said levers, said shifting gears being adapted to be moved to selectively engage said drive gears, a connection to each of said levers extending through one side of said casing and provided with an operating lever, a quadrant on said casing adjacent each operating lever, each of said quadrants having a step corresponding to the drive gear to be selected by the shifting gear of the respective levers, a track on each quadrant, means on each operating lever resiliently engaging said respective track to urge said operating lever to selected position whereby the respective shifting gears are urged to full engaged position with the selected drive gears, a horizontally disposed differential shaft disposed in said housing, differentially arranged gears disposed on said differential shaft and adapted to be driven by said supplemental shafts, a vertically disposed driven shaft operatively connected to said differentially arranged gears, indicating means for showing the engagement between said drive gears and the respective shifting gears, and operative connections between said indicating means and gear shifting levers.

7. In variating mechanism, the combination of a housing, a vertically disposed drive shaft journalled in said housing, a horizontally disposed drive gear shaft disposed in said housing, rotatable drive gears mounted on said drive gear shaft, a connection between said drive gears and said drive shaft whereby said drive shaft drives said drive gears, supplemental shafts journalled in said housing and disposed so that the axes of said supplemental shafts are parallel to the axis of rotation of said drive gears, a gear shifting lever slidably mounted on each of said supplemental shafts, a gear non-rotatably and slidably mounted on each of said supplemental shafts and movable with said gear shifting lever, a shifting gear meshing with said slidable gear and rotatably mounted on each of said levers, said shifting gears being adapted to be moved to selectively engage said drive gears, a connection to each of said levers extending through one side of said casing and provided with an operating lever, a quadrant on said casing adjacent each operating lever, each of said quadrants having a step corresponding to the drive gear to be selected by the shifting gear of the respective levers, a track on each quadrant, means on each operating lever resiliently engaging said respective track to urge said operating lever to selected position whereby the respective shifting gears are urged to full engaged position with the selected drive gears, a horizontally disposed differential shaft disposed in said housing, differentially arranged gears disposed on said differential shaft and adapted to be driven by said supplemental shafts, a vertically disposed driven shaft operatively connected to said differentially arranged gears, indicating means for showing the engagement between said drive gears and the respective shifting gears, operative connections between said indicating means and gear shifting levers, said operative connections including a bail for each supplemental shaft fixed against longitudinal movement with respect to said supplemental shafts but rotatable with respect thereto, a slidable connection between each gear shifting lever and its adjacent bail whereby said bail is rotated upon rotation of said gear shifting lever, and gear means for rotating said indicating means, said gear means being rotated by said bails.

8. In variating mechanism, the combination of a housing, a drive shaft journalled in said housing, a drive gear shaft disposed in said housing, rotatable drive gears mounted on said drive gear shaft, a connection between said drive gears and said drive shaft whereby said drive shaft drives said drive gears, supplemental shafts journalled in said housing and disposed so that the axes of said supplemental shafts are parallel to the axis of rotation of said drive gears, a gear shifting lever slidably mounted on each of said supplemental shafts, a gear non-rotatably and slidably mounted on each of said supplemental shafts and movable with said gear shifting lever, a shifting gear meshing with said slidable gear and rotatably mounted on each of said levers, said shifting gears being adapted to be moved to selectively engage said drive gears, a connection to each of said levers extending through one side of said casing and provided with an operating lever, a quadrant on said casing adjacent each operating lever, each of said quadrants being calibrated to correspond to the drive gears whereby when said operating levers are moved to one of said calibrations the shifting gear of said operating levers engages the corresponding drive gear, a differential shaft disposed in said housing, differentially arranged gears disposed on said differential shaft and adapted to be driven by said supplemental shafts, and a driven shaft operatively connected to said differentially arranged gears.

9. In variating mechanism, the combination of a housing, a drive shaft journalled in said housing, a drive gear shaft disposed in said housing, rotatable drive gears mounted on said drive gear shaft, a connection between said drive gears and said drive shaft whereby said drive shaft drives said drive gears, supplemental shafts journalled in said housing and disposed so that the axes of said supplemental shafts are parallel to the axis of rotation of said drive gears, a gear shifting lever slidably mounted on each of said supplemental shafts, a gear non-rotatably and slidably mounted on each of said supplemental shafts and movable with said gear shifting lever, a shifting gear meshing with said slidable gear and rotatably mounted on each of said levers, said shifting gears being adapted to be moved to selectively engage said drive gears, a connection to each of said levers extending through one side of said casing and provided with an operating lever, a quadrant on said casing adjacent each operating lever, each of said quadrants being calibrated to correspond to the drive gears whereby when said operating levers are moved to one of said calibrations the shifting gear of said operating levers engages the corresponding drive gear, a differential shaft disposed in said housing, differentially arranged gears disposed on said differential shaft and adapted to be driven by said supplemental shafts, a driven shaft operatively connected to said differentially arranged gears, indicating means for showing the engagement between said drive gears and the respective shifting gears, operative connections between said indicating means and gear shifting levers, said operative connections including a bail for each supplemental shaft fixed against longitudinal movement with respect to said supplemental shafts but rotatable with respect thereto, a slidable connection between each gear shifting lever and its adjacent bail whereby said bail is rotated upon rotation of said gear shifting lever, and gear means for rotating said indicating means, said gear means being rotated by said bails.

OTTO WILD, Jr.

CERTIFICATE OF CORRECTION.

Patent No. 2,296,966. September 29, 1942.

OTTO WILD, JR.

It is hereby certified that error appears in the printed specification of the above numbered patent requiring correction as follows: Page 2, first column, line 63, after "mounted" insert "to"; and second column, line 17, for "multilated" read --mutilated--; page 4, first column, line 28, for "gears, and" read --gears, said--; and that the said Letters Patent should be read with this correction therein that the same may conform to the record of the case in the Patent Office.

Signed and sealed this 17th day of November, A. D. 1942.

(Seal)

Henry Van Arsdale,
Acting Commissioner of Patents.